Aug. 29, 1933.    R. N. BROWN    1,924,833
BRAKE TESTING APPARATUS
Filed Oct. 12, 1927    2 Sheets-Sheet 2
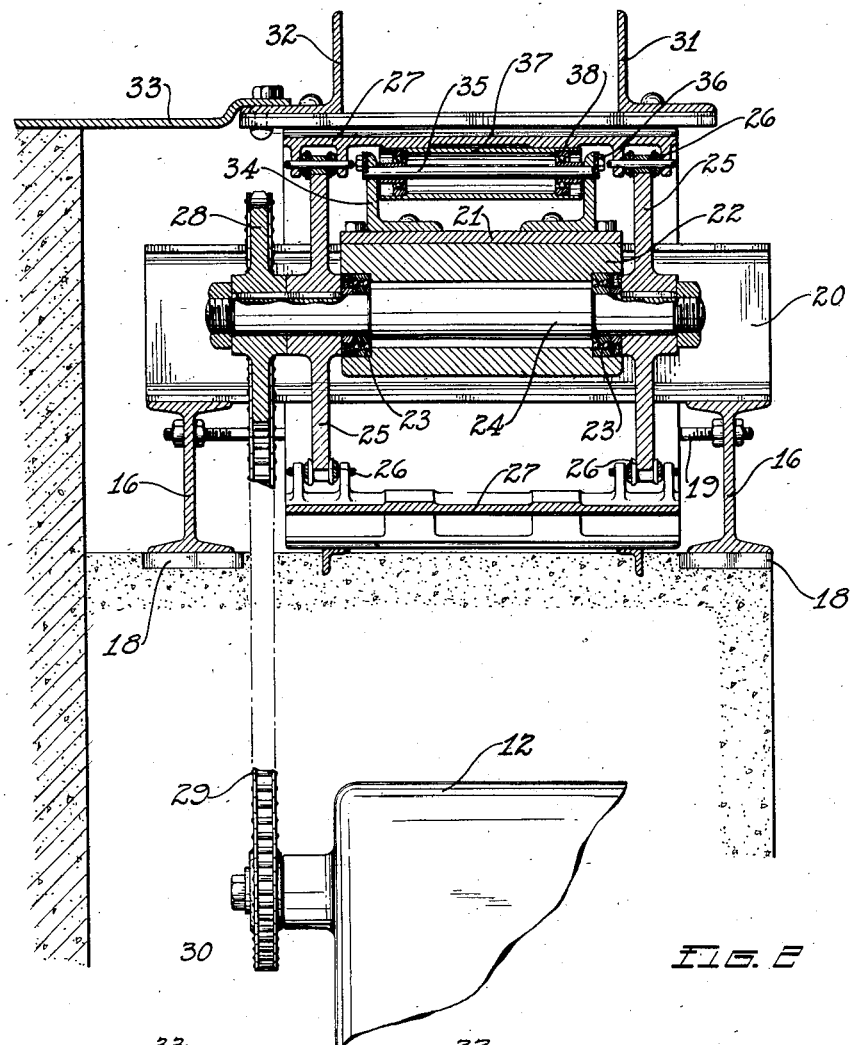
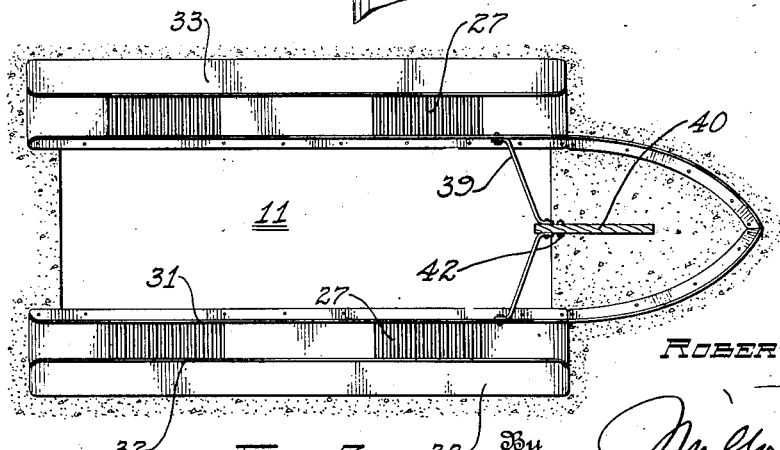

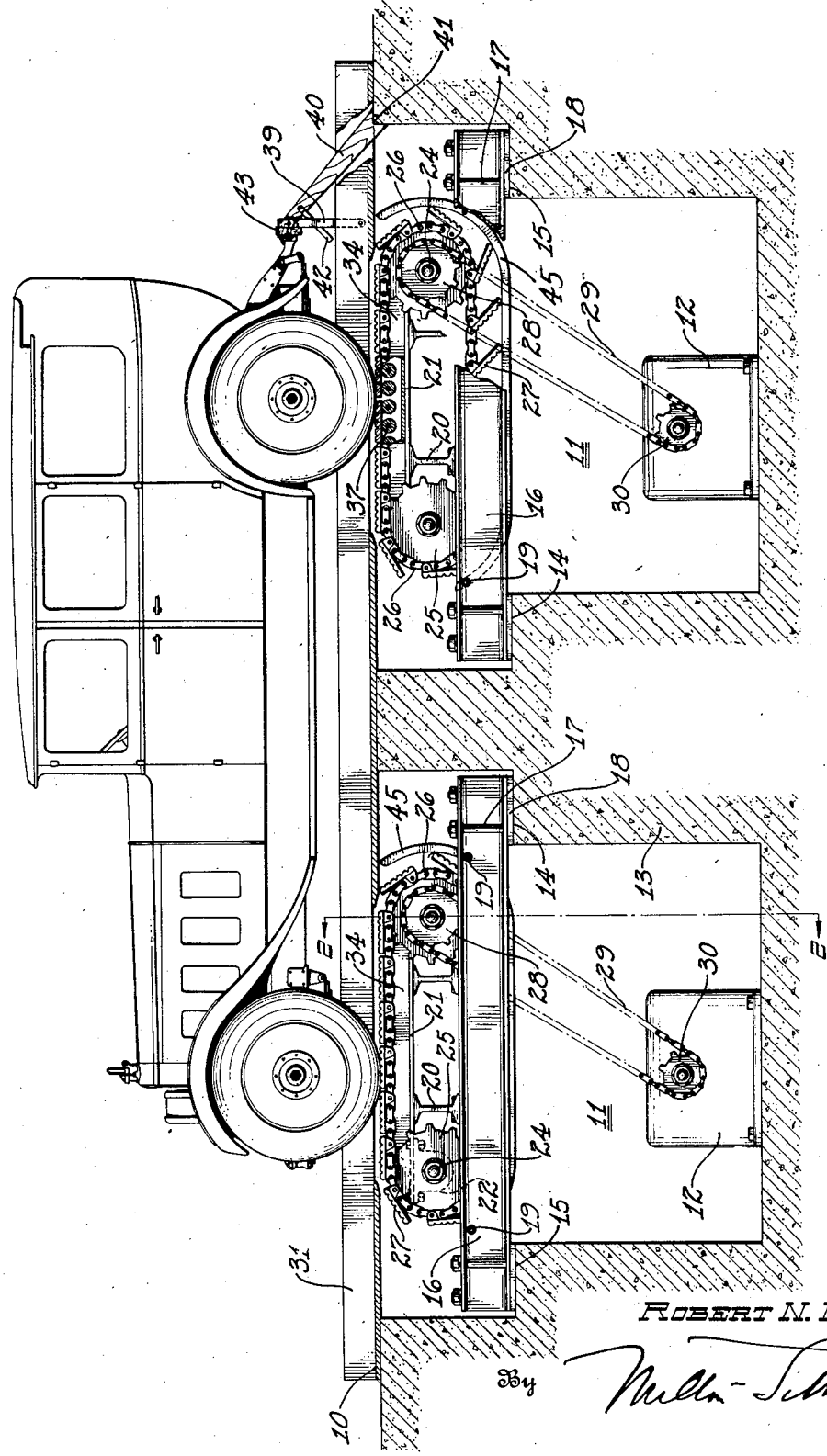

Patented Aug. 29, 1933

1,924,833

UNITED STATES PATENT OFFICE 1,924,833

BRAKE TESTING APPARATUS

Robert N. Brown, Detroit, Mich., assignor to Packard Motor Car Company, Detroit, Mich., a corporation of Michigan Application October 12, 1927. Serial No. 225,661

2 Claims. (Cl. 73—51)

This invention relates to brake testing apparatus and more particularly to such apparatus for testing motor vehicle brakes.

An object of the invention is to provide an apparatus for testing motor vehicle brakes, the apparatus being adaptable for installation in a vehicle assembly line so that the testing of the brakes can be expeditiously accomplished.

Another object of the invention is to provide an apparatus for testing motor vehicle brakes having two sets of endless platforms each connected to a brake testing apparatus of any known type, whereby the braking effect per wheel in terms of pounds may be readily ascertained to enable a proper adjustment thereof.

A further object of the invention is to provide a brake testing apparatus positioned in a stretch of track or vehicle assembly line, the apparatus comprising two pair of endless platforms arranged laterally in the track and equally spaced to receive the wheels of motor vehicles of a different wheel base and of a standard tread.

A still further object of the invention is to provide a brake testing apparatus comprising a plurality of endless platforms connected respectively to brake testing devices of a preferred type, the platforms being positioned in a stretch of track having arranged therein a collapsible abutment adapted to retain a motor vehicle upon the platforms so that the braking effect of the brake for each wheel may be tested.

With these objects in view which may be incident to my improvement, the invention consists of parts and combinations of parts to be herein-after set forth and claimed, with the understanding that the several elements comprising my invention, may be varied in construction, proportion and arrangement, without departing from the spirit or scope of the appended claims.

In order to make the invention more clearly understood, I have shown in the drawings means for carrying the same into practical effect, without limiting the invention in its useful applications to the particular construction, which for the purpose of this explanation, has been made the subject of illustration.

In the drawings forming a part of this specification:

Fig. 1 is a longitudinal sectional view of a stretch of vehicle assembly line having a pit therein, in which is installed the brake testing apparatus with a car in position thereon;

Fig. 2 is a vertical sectional view taken on line 2—2 of Fig. 1, and

Fig. 3 is a top plan view of a stretch of vehicle assembly line illustrating the endless platforms in the guideway.

Referring by numerals to the drawings, 10 represents a motor vehicle assembly line having arranged therein a suitable pit 11 in which two sets of suitable brake testing devices 12 are arranged in pairs in spaced relation. Positioned within the pit 11 are oppositely disposed columns 13 centrally spaced between the end walls of the pit and provided with shoulder portions 14 oppositely disposed to similar shoulder portions 15 in the respective end walls. The shoulder portions 14 and 15 support I-beams 16 arranged longitudinally in pairs in spaced relation and secured upon the shoulder portions 14 and 15 by bolts 17 with suitable bearing plates 18 interposed and braced to each other by tie rods 19. Each pair of I-beams 16 support transverse I-beams 20 suitably spaced to support a longitudinal plate 21 bolted or otherwise secured thereto.

A suitable boxing or housing 22 is supported from each end of the longitudinal plate 21 and provided with a pair of spaced bearings 23 in which is journaled a shaft 24 having keyed thereupon adjacent each end of the boxing 22 a sprocket 25. The sprockets upon the respective sides of the housings are connected by sprocket chains 26 having arranged thereupon transverse shoes 27 pivotally connected thereto and arranged to provide an endless platform. One of the shafts 24 also has keyed thereupon an outboard sprocket 28 connected by a suitable sprocket chain 29 to a sprocket 30 driven by the brake testing device 12 which may be of any preferred type. Guide or runner members 45 conforming in shape to and spaced from the endless tracks in parallel relation thereto are suitably supported adjacent the downwardly moving ends of the tracks and along the lower run thereof to support and guide the pivoted shoes 27.

The shoes 27 on the sprocket chain 26 are so positioned in the vehicle assembly line to provide an endless platform on a plane with the surface of the assembly line track, and the track is provided with parallel guides 31 and 32 suitably spaced to receive the wheels of a motor vehicle, the outer guideway 32 being connected by a plate 33 to the side walls of the pit.

To lend sufficient strength and rigidity to the plate 21 and the endless platforms supported thereby, over which the motor vehicles travel as they progress down the assembly line, the plate 21 has bolted thereupon parallel angle irons 34. These angle irons are so positioned on the plate 21 to provide a suitable support for a plurality of transverse shafts 35 locked in position as indicated at 36 and each shaft supports a roller 37 mounted upon suitable bearings 38, the rollers engaging the backs of the transverse shoes 27 to support the shoes in the same plane with the surface of the assembly line and to prevent sagging of the travelling platform.

Pivotally connected to and between the guides 31 at one end of the pit adjacent a pair of endless platforms is a yoke member 39 having pivotally connected thereto an arm 40, notched at its free end as indicated at 41 to engage the upper edge of the pit. The arm 40 is provided with a handle 42 for raising and lowering the yoke and a cross bar 43 adapted to function as a stop or abutment to retain a motor vehicle in position on the endless platforms, or the member 43 might be detached and made adaptable for connection to the motor vehicle, in which case the yoke 39 and the arm 40 will function as the abutment for engaging the cross bar.

In operation, when it is desired to test and adjust the brakes of a motor vehicle, the vehicle is moved down the assembly line until it rests in a position directly over the pit, in which position each wheel rests upon one of the endless platforms. The abutment at the rear of the vehicle is then adjusted by pulling upwardly and forwardly on the handle 42 to raise the yoke 39 in a substantially vertical position permitting the notched end of the arm 40 to engage the upper edge of the wall of the pit, in which position the abutment prevents the car from moving backwardly.

With the car in position, shown in Fig. 1, the brakes are applied and the testing devices 12 set in motion. The testing devices through means of the sprocket chain 29 set in motion the endless platforms upon which the vehicle is positioned causing the vehicle to be moved backwardly against the abutment and continued movement of the platforms causes the wheels of the vehicle to be rotated through their frictional engagement with the endless platforms. The brake testing devices are rotated at a slow speed and by their connections with the travelling platforms above described cause the wheels of the vehicle to be rotated against the action of the brakes. The testing devices are of such a character as to directly indicate in terms of pounds the braking effect, thus an operator in the pit can readily adjust each of the brakes until the resistance is at the desired value, whereupon the testing devices are stopped, the vehicle brakes are released and the vehicle proceeds down the assembly line. The abutment is then tripped to allow the next vehicle to enter upon the platforms.

While I have herein described in some detail a specific embodiment of my invention, which I deem to be new and advantageous and may specifically claim, I do not desire it to be understood that my invention is limited to the exact details of construction, as it will be apparent that changes may be made therein without departing from the spirit or scope of my invention.

Having thus described the various features of the invention, what I claim as new and desire to secure by Letters Patent is:

1. Brake testing apparatus for motor vehicles comprising supporting means having a pit therein, guide tracks for the vehicle wheels on the supporting means and extending across the pit, endless treads supported in said pit and arranged to extend thereacross substantially flush with said wheel tracks, power measuring devices connected to drive said endless treads, a stop member pivoted to the tracks to cooperate with the vehicle body, and a movable bracing member extending between the stop member and the walls of the pit.

2. In a brake testing traction device for vehicles, a pair of parallel supporting beams adapted to be anchored at their ends, a frame structure mounted on the beams, a pair of shafts carried by the frame structure between the beams and extending normal thereto, sprockets on the ends of the shafts, rollers carried by the upper portion of the frame structure intermediate the sprockets, an endless traction chain surrounding and engaging the sprockets, said chain having treads pivoted at one end thereto, the upper run of said traction chain being supported on the rollers, and a runner fixed between the beams in parallel relation with the lower run of the chain, said runner being spaced from the exterior of the chain and supporting the free ends of the treads of the lower run of the chain.

ROBERT N. BROWN.